Nov. 21, 1967 M. H. CROWELL 3,354,408

MICROWAVE PULSE GENERATOR

Filed May 2, 1966

INVENTOR
M. H. CROWELL
BY
R. B. Anderson
ATTORNEY 3,354,408

MICROWAVE PULSE GENERATOR

Merton H. Crowell, Morristown, N.J., assignor to Bell Telephone Laboratories, Incorporated, New York, N.Y., a corporation of New York Filed May 2, 1966, Ser. No. 546,768
12 Claims. (Cl. 331—107)

ABSTRACT OF THE DISCLOSURE

A pulse generator includes means for establishing a plurality of oscillating modes each separated by the same constant frequency. The modes, when combined together and modulated at the mode separation frequency, become phase-locked thereby to produce a pulsed output.

This invention relates to pulse generators which produce a train of narrow pulses at microwave frequencies.

A conventional pulse generator produces a train of pulses by utilizing a time-varying circuit parameter. In one of its simplest forms, a pulse generator comprises a mechanical switch, which is the time-varying circuit parameter, connected in series with a signal source. By opening and closing the mechanical switch, a train of pulses is obtained. Both the pulse repetition rate and the pulse width of the pulse train are limited, however, by the speed at which the mechanical switch can be operated.

In more sophisticated pulse generators, a device such as an electron tube or transistor replaces the mechanical switch. The time-varying circuit parameter in such generators is typically the gain of the device which is changed by pulsing a control element (e.g., the base of a transistor or the grid of a tube). Even in these pulse generators the narrowest obtainable pulse width is limited by the minimum time required to change the device parameter.

It is an object of this invention to reduce the obtainable pulse width of pulses produced by a high frequency pulse generator.

In its general embodiment, the invention comprises a microwave cavity resonator connected in series with a negative resistance element. A plurality of such series combinations are connected in parallel, thus defining a periodic structure. A modulator is connected in parallel with the periodic structure, and the output is taken across some suitable load connected in parallel with the modulator.

Each of the cavity resonators is tuned to a different resonant frequency or oscillation mode such that the frequency separation between any pair of adjacent resonators is a constant. This constant frequency will be hereinafter termed the mode separation frequency. Each of the negative resistance elements provides gain at the resonant frequency of the microwave cavity with which it is in series. All modes experience the same gain and have the same amplitude.

One feature of the invention is that an appropriate modulator, driven at the mode separation frequency, couples together (i.e., phase-locks) the modes of the cavity resonators thereby producing a pulsed output. It is an advantage of this invention that the pulse width is inversely proportional to the number of cavity resonators connected in parallel, and that the ratio of peak power to average power is equal to the number of such resonators. Hence the pulse width can be made small, without device parameter limitation, by increasing the number of such resonators. Such a microwave pulse generator is an ideal energy source (i.e., carrier) for a pulse code modulation system.

Modulation, in accordance with the present invention, is to be distinguished from standard modulation arrangements intended to convey information. In such latter arrangements, either the amplitude or the frequency of a carrier is varied in accordance with the information to be conveyed. In the instant case, however, modulation is first utilized to establish phase-locking which in turn produces a pulse train—the carrier. This carrier can subsequently be encoded (i.e., modulated) by the elimination of pulses in accordance with information to be conveyed.

The invention and the several objects and features thereof will be understood more clearly and fully from the following detailed description with reference to the accompanying drawings, in which.

Figures 1, 2, 3A, 3B:
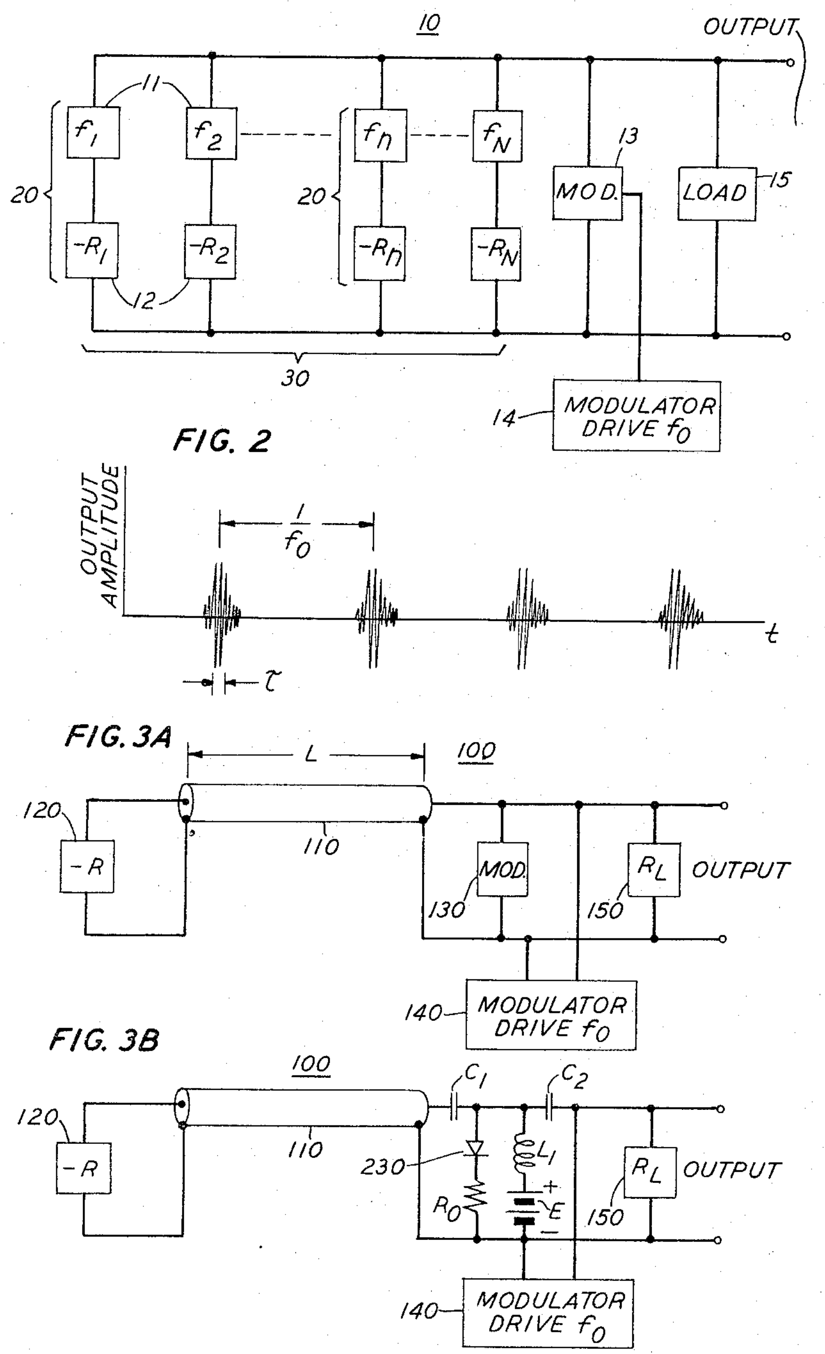
FIG. 1 is a block diagram of a general embodiment of the invention.
FIG. 2 is illustrative of a pulse train produced by the invention.
FIGS. 3A and 3B are illustrations of a particular illustrative embodiment of the invention which employs a mismatched TEM line instead of a plurality of paralleled resonators.

Referring to FIG. 1 in detail, the microwave pulse generator 10 comprises in combination a plurality of microwave cavity resonators 11 each connected in series with a negative resistance element 12, thereby forming a plurality of microwave oscillators 20 each having a characteristic frequency mode. The oscillators 20, N in number, are connected in parallel, thereby defining a periodic structure 30. Each of the negative resistance elements, typically Esaki diodes, is capable of providing gain at the resonant frequency of the cavity to which it is connected in series. All of the oscillators 20 are designed to generate microwave oscillation modes of essentially the same amplitude. A modulator 13, typically a time-varying resistance element such as a biased microwave diode, is connected in parallel with the periodic structure 30; the output from the group of resonators is taken across some suitable load 15. The modulator 13 is excited by a modulator drive 14, typically an oscillator.

The interconnection of the cavity resonators with each other and to the negative resistance elements is accomplished by techniques well known in the art. Arrangements for biasing the modulator and the negative resistance elements and for tuning the resonators are equally well known.

The operation of the pulse generator is essentially as follows. Each of the cavity resonators 11 of the oscillators 20 is tuned to a particular frequency such that the frequency of the $n^{th}$ oscillator, $f_n$, is given by $$f_n - f_{n-1} = f_o \qquad (1)$$

where $f_o$ is termed the mode separation frequency. The modulator 13 is driven at the mode separation frequency $f_o$ by the modulator drive 14. Under these conditions the oscillation modes of the various oscillators 20 constructively interfere at periodic time intervals equal to $1/f_o$. This coupling phenomenon inherently adjusts the relative phase angles of the various modes to a minimum loss condition for the system. When phase-locked, it can further be shown that the phase angle $\varphi_n$ of the $n^{th}$ oscillator is given by, $$\varphi_n - n\psi_o + \psi_1 \qquad (2)$$

or equivalently $$\varphi_n - \varphi_{n-1} = \psi_o \qquad (3)$$

where $\psi_1$ and $\psi_o$ are constants, and $\varphi_{n-1}$ is the phase angle of the oscillator $n-1$ next preceding the $n^{th}$ oscillator. The mechanism of phase-locking is analogous to the coupling of the optical frequency modes in a pulse regenerative maser oscillator of the type disclosed in the copending application of L. E. Hargrove, Serial No. 362,-319, filed April 24, 1964, and assigned to applicant's assignee.

The modulator 13 inherently creates sidebands at the sum and difference frequencies $f_n \pm f_o$ of each mode. In so doing, a portion of the power in each mode is transferred to the sidebands associated with that mode. For optimum mode coupling as described above, the power $P_{sb}$ transferred to the sidebands of each mode (not the total power transferred to all sidebands) should be greater than the power conversion of each negative resistance element 12; that is $$P_{sb} > P_o - P_i \tag{4}$$

where $P_i$ and $P_o$ are the power input and output, respectively, of each negative resistance element 12.

When Equations 1, 2 and 4 are satisfied, it can be shown that the output from the group of microwave oscillators taken across the load 15 is a pulse train having the properties that the peak power of an output pulse increases, and the pulse width decreases, by increasing the number, N, of paralleled oscillators 20. A typical pulse train produced by this invention is shown in FIG. 2. Thus, whereas the pulse width in formerly known pulse generators is limited by the minimum time required to change a device parameter, in the present invention the pulse width can be made small by making N large without device parameter limitation.

The microwave pulse generator 10 of FIG. 1 requires separate tuning of the oscillators 20 in order to satisfy the condition of Equation 1 that the mode separation frequency be $f_o$. It is possible, however, to construct a microwave pulse generator which utilizes only one negative resistance element and thereby to avoid the necessity of multiple tuning. In the embodiment of the invention shown in FIG. 3A, the microwave pulse generator 100 comprises a TEM high frequency transmission line 110 having a characteristic impedance $Z_o$. A broadband negative resistance element 120, typically an Esaki diode, is connected to input terminals of the TEM line. A load 150, comprising a resistance $R_L$, and a modulator 130, comprising a time-varying resistance (e.g., a biased microwave diode), are connected in parallel across the output terminals of the TEM line. The modulator 130 is driven by the modulator drive 140, typically an oscillator. Analogous numerals have been used in FIG. 3A and FIG. 1 to facilitate comparison.

The mode of operation is essentially as follows: If the load 150 is selected such that either $R_L >> Z_o$ or $R_L << Z_o$; that is, such that the TEM line is mismatched, then the subsequent reflections of wave energy at the load will establish oscillating modes on the line separated by a constant frequency, $f_o$. Each of the oscillating modes has the same amplitude and undergoes the same amplification by the negative resistance element 120. The mode separation frequency, $f_o$, for the mismatched TEM line is given by $$f_o = \frac{c}{2L} \tag{5}$$

where $c$ is the velocity of propagation of energy on the line and L is the length of the line. The frequency of the $n^{th}$ mode, $f_n$, for a purely resistive load is $$f_n = \frac{nc}{2L} \tag{6}$$

Typically $f_n$ and $f_o$ might be $10^{11}$ c.p.s. and $10^8$ c.p.s. respectively.

The load 150 need not be purely resistive, however. The effect of a reactive component would be to shift the frequency of each mode by the same amount and therefore, to a first order approximation, leave $f_o$ unchanged. The quantitative effect of a reactive load component on the mode frequencies is analyzed in standard transmission line textbooks such as Circuit Analysis of Transmission Lines by J. L. Stewart, John Wiley & Sons, Inc., 1958, chapter 6.

The negative resistance element 120 is chosen so as to provide gain at each of the modes, and the modulator 130 is driven at the mode separation frequency by the modulator drive 140. If the resistance, $R_m$, of the modulator 130 is written as $$R_m = R_o + R_1 \cos 2\pi f_o (t - t_1) \tag{7}$$

where $R_o$, $R_1$ and $t_1$ are all constants, and, if the voltage drops around the loop of FIG. 3A are written according to Kirchoff's laws, it can be shown that $$O = I_{n+1} \sin(\varphi_{n+1} - \varphi_n + 2\pi f_o t_1) + I_{n-1} \sin(\varphi_{n-1} - \varphi_n - 2\pi f_o t_1) \tag{8}$$

if $(R_L R_1 / R_o^2) << 1$. $I_n$, the current amplitude of the $n^{th}$ frequency mode, is real and time independent. Because all oscillating modes experience the same gain and loss, it is reasonable to assume that $I_n = I_{n+1}$ for $1 \leq n \leq N$. With this rectangular distribution of mode amplitudes, Equation 8 is satisfied when $$\varphi_n = -n 2\pi f_o t_1 + \psi_o \tag{9}$$

It can be shown that the phase relationships of Equation 9, induced by driving the modulator 130 at the mode separation frequency $f_o$, will produce a pulse train at the output taken across the load 150. The pulse width $\tau$, defined by the half power points of the pulse, can be evaluated as $$\tau = \frac{1}{N f_o} \tag{10}$$

and the ratio of peak power to average power can be evaluated as $$\frac{P_{peak}}{P_{ave}} = N$$

As in the microwave oscillator 10 of FIG. 1, in this particular embodiment 100 the pulse width is not limited by any device parameter but can be made very small, in the subnanosecond range, by increasing the number of oscillating modes N.

In a practical system N is limited by the finite bandwidth over which the negative resistance element 120 will provide gain. Thus, if gain is provided over a range of frequencies from zero to $f_{max}$, and the mode separation frequency $f_o$ is less than $f_{max}$, then N must satisfy the inequality $N f_o \leq f_{max}$.

In practice the modulator 130 is a microwave diode 230 typically biased by the battery circuit shown in FIG. 3B. The usual coupling capacitors $C_1$ and $C_2$ prevent direct current from entering the TEM line 110 and the modulator drive 140, respectively. The R.F. choke $L_1$ prevents R.F. current from entering the battery.

Alternatively, the time-varying resistance, represented by the modulator 130, can be replaced by a time-varying capacitance, typically a varactor diode.

Summarizing, then, the output from a group of microwave oscillators can be combined to form a subnanosecond pulse train, provided that (1) the frequency of the $n^{th}$ oscillator, $f_n$, is $f_n = f_{n-1} + f_o$, (2) the output is modulated at $f_o$, (3) the power transferred by the modulator to the sidebands of each mode is greater than the power conversion of each negative resistance element, and (4) by so modulating the phase of the $n^{th}$ oscillator, $\varphi_n$, is caused to be $\varphi_n = n\psi_o + \psi_1$.

It is to be understood that the above-described arrangements are merely illustrative of the many possible specific embodiments which can be devised to represent application of the principles of the invention. Numerous and varied other arrangements can readily be devised in accordance with these principles by those skilled in the art without departing from the spirit and scope of the invention.

What is claimed is:

1. A microwave pulse generator comprising means for establishing a plurality of microwave oscillating modes each separated by the same constant frequency, means for providing gain at each of said modes, means for combining said modes, and means for modulating said modes at the mode separation frequency thereby to couple together said modes and to produce a pulsed output.

2. The microwave pulse generator of claim 1 wherein said modulating means produces pairs of sidebands at the sum and difference frequencies of each of said modes, and the power transferred to each of said pairs of sidebands by said modulator is greater than the power conversion of said gain producing means.

3. The microwave pulse generator of claim 2 wherein said mode establishing means comprises a plurality of microwave cavity resonators connected in parallel.

4. The microwave pulse generator of claim 3 wherein said modulating means comprises a resistance element connected in parallel with said microwave cavity resonators, and means for time-varying the resistance of said element at the mode separation frequency.

5. The microwave pulse generator of claim 4 wherein said resistance element comprises a microwave diode.

6. The microwave pulse generator of claim 3 wherein said modulating means comprises a capacitance element connected in parallel with said microwave cavity resonators, and means for time-varying the capacitive reactance of said element at the mode separation frequency.

7. The microwave pulse generator of claim 6 wherein said capacitance element is a varactor diode.

8. The microwave pulse generator of claim 2 wherein said mode establishing means comprises a transmission line and a mismatched resistive load connected across the output end of said transmission line thereby to reflect transmitted energy on said transmission line and to establish oscillating modes thereon.

9. The microwave pulse generator of claim 8 wherein said modulating means comprises a resistance element connected across the output of said transmission line and means for time-varying the resistance of said element at the mode separation frequency.

10. The microwave pulse generator of claim 9 wherein said resistance element comprises a microwave diode.

11. The microwave pulse generator of claim 8 wherein said modulating means comprises a capacitance element connected across the output of said transmission line and signal means for time-varying the capacitive reactance of said element at the mode separation frequency.

12. The microwave pulse generator of claim 11 wherein said capacitance element is a varactor diode.

References Cited

UNITED STATES PATENTS

| | | | |
|---|---|---|---|
| 3,231,831 | 1/1966 | Hines | 331—107 |
| 3,246,256 | 4/1966 | Sommer | 331—107 |
| 3,252,112 | 5/1966 | Haver | 331—107 |

ROY LAKE, *Primary Examiner.*

J. KOMINSKI, *Examiner.*